US005835076A

United States Patent [19]

Machida et al.

[11] Patent Number: 5,835,076

[45] Date of Patent: Nov. 10, 1998

[54] PEN INPUT LIQUID CRYSTAL DISPLAY CAPABLE OF DISPLAYING HIGH-CONTRAST IMAGES IN THE ABSENCE OF A PEN INPUT

[75] Inventors: Junichi Machida, Chiba-ken; Nobuyuki Kawano; Takeshi Suyama, both of Kanagawa-ken, all of Japan

[73] Assignee: Kabushiki Kaisha Toshiba, Kawasaki, Japan

[21] Appl. No.: 544,479

[22] Filed: Oct. 18, 1995

[30] Foreign Application Priority Data

Oct. 19, 1994 [JP] Japan .................................... 6-253233

[51] Int. Cl.$^{6}$ ........................................................ G09G 3/36

[52] U.S. Cl. .......................... 345/104; 345/173; 345/179; 178/18.01

[58] Field of Search .................................... 345/104, 179, 345/173, 100, 98, 174, 182; 178/18.01, 19.01, 18.03, 18.1, 19.05, 19.04

[56] References Cited

U.S. PATENT DOCUMENTS

| | | | |
|---|---|---|---|
| 5,448,024 | 9/1995 | Kawaguchi et al. | 345/179 |
| 5,646,643 | 7/1997 | Hirai et al. | 345/100 |
| 5,677,744 | 10/1997 | Yoneda et al. | 345/104 |

FOREIGN PATENT DOCUMENTS 3-296127 12/1991 Japan .

*Primary Examiner*—Lun-Yi Lao
*Attorney, Agent, or Firm*—Oblon, Spivak, McClelland, Maier & Neustadt, P.C.

[57] ABSTRACT

A pen input liquid crystal display has row electrodes, column electrodes orthogonal to the row electrodes, and a liquid crystal layer interposed between the row and column electrodes. A pen input detecting signal is applied to one of the column electrodes, and display signals to the other column electrodes. The column electrode that receives the pen input detecting signal is sequentially shifted among the column electrodes, to simultaneously carry out a pen input scanning operation and an image displaying operation.

4 Claims, 6 Drawing Sheets

| | COM MODE (SCANNING) | SEG MODE |
|---|---|---|
| a SIGNAL | | |
| b SIGNAL | COM SIGNAL (SCANNING) | SEG SIGNAL (DATA) |
| c SIGNAL | COM SIGNAL (SCANNING) | COM SIGNAL (SCANNING) |

| | SEG MODE | COM MODE (SCANNING) | SEG MODE |
|---|---|---|---|
| a SIGNAL | | | |
| b SIGNAL | SEG SIGNAL (DATA) | COM SIGNAL (SCANNING) | SEG SIGNAL (DATA) |
| c SIGNAL | COM SIGNAL (SCANNING) | COM SIGNAL (SCANNING) | COM SIGNAL (SCANNING) |

PEN INPUT LIQUID CRYSTAL DISPLAY CAPABLE OF DISPLAYING HIGH-CONTRAST IMAGES IN THE ABSENCE OF A PEN INPUT

BACKGROUND OF THE INVENTION

1. Field of the Invention

The present invention relates to a pen input liquid crystal display (LCD) capable of displaying high-contrast images.

2. Description of the Prior Art

FIG. 1 shows a simple-matrix pen input LCD according to a prior art. The LCD has a liquid crystal panel 101. Column electrodes (segment electrodes) S1 to Sm extend vertically in parallel with one another on the panel 101. Row electrodes (common electrodes) C1 to Cn extend horizontally in parallel with one another on the panel 101. The row electrodes are orthogonal to the column electrodes. The column electrodes S1 to Sm are driven by a segment driver 107, and the row electrodes C1 to Cn are driven by a common driver 109. The drivers 107 and 109 operate in response to control signals provided by a controller 111, which carries out a scanning operation. Each of the intersections between the segment and row electrodes forms a pixel. Proper voltages are applied to the pixels to display an image.

FIGS. 2 and 3 explain the operation of the LCD of FIG. 1. The segment driver 107 operates in response to a control signal b, and the common driver 109 operates in response to a control signal c. A mechanism of displaying an image on the panel 101 is the same as that of a standard LCD having no pen input function. Namely, the row electrodes C1 to Cn are activated one after another in response to a signal COM provided by the common driver 109, to vertically scan the panel 101. In synchronization with this, the segment driver 107 provides a signal SEG to drive each column electrode.

A pen input scanning operation to identify the position of a pen input is separately carried out from the image displaying operation. To detect the horizontal position of the pen input, the segment driver 107 provides a scanning signal resembling the signal COM, to activate the column electrodes S1 to Sm one after another to horizontally scan the panel 101. To detect the vertical position of the pen input, the common driver 109 activates the row electrodes C1 to Cn one after another, to detect a specific output signal from one of the row electrodes. The image displaying operation and pen input scanning operation are alternated in response to a change-over signal a.

According to this prior art, the segment driver 107 provides no display data during the pen input scanning operation. As a result, the contrast of an image displayed during this period deteriorates. Since the simple-matrix LCD has no function of providing a voltage to maintain the state of each pixel, the contrast of an image drastically deteriorates during the period in which no display data is provided. The prior art, therefore, is inadequate for pen input color LCDs.

SUMMARY OF THE INVENTION

An object of the present invention is to provide a pen input LCD capable of displaying high-contrast images.

Another object of the present invention is to provide a pen input LCD capable of providing a display quality equal to that of a standard LCD having no pen input function.

Still another object of the present invention is to provide a pen input LCD capable of providing high-contrast images without alternating an image displaying operation and a pen input scanning operation.

In order to accomplish the objects, the present invention provides a pen input LCD having row electrodes, column electrodes that are orthogonal to the row electrodes, a liquid crystal layer interposed between the row and column electrodes, to form a pixel at each intersection between the row and column electrodes, a row electrode controller for providing the row electrodes with a control signal, and a column electrode controller for providing the column electrodes with a control signal. The row electrode controller activates the row electrodes one after another, to carry out a scanning operation. In synchronization with the scanning operation, the column electrode controller provides the column electrodes with display data to display an image on the liquid crystal layer. At this time, one of the column electrodes is provided with a pen input detecting signal, and the others with the display data. The column electrode that is provided with the pen input detecting signal is successively changed among the column electrodes, to identify the position of the pen input.

The column and row electrodes may be arranged according to a simple matrix driving method.

The pen input scanning operation and the image displaying operation may be synchronized with each other.

The column electrode controller may have a first shift register for converting serial display data into parallel display data, a second shift register for receiving a pen input detecting signal and shifting each bit thereof, and a selector for simultaneously receiving data from the first and second shift registers and providing a signal serving both for the image displaying operation and pen input scanning operation.

With these arrangements, the pen input LCD according to the present invention always provides display data through the column electrode controller so that the pen input scanning operation may never deteriorate the quality of an image displayed.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DETAILED DESCRIPTION OF THE EMBODIMENTS

Figure 1:
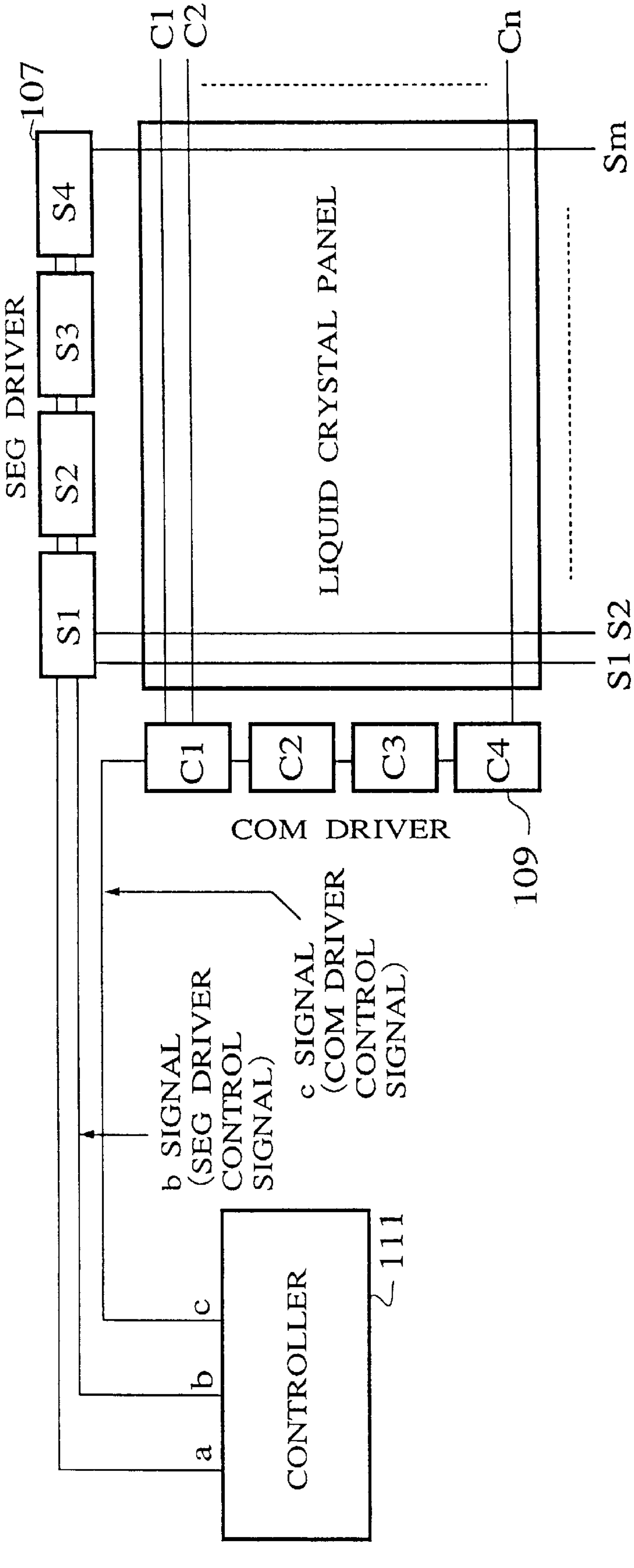
FIG. 1 shows an LCD according to a prior art.
Figure 2:
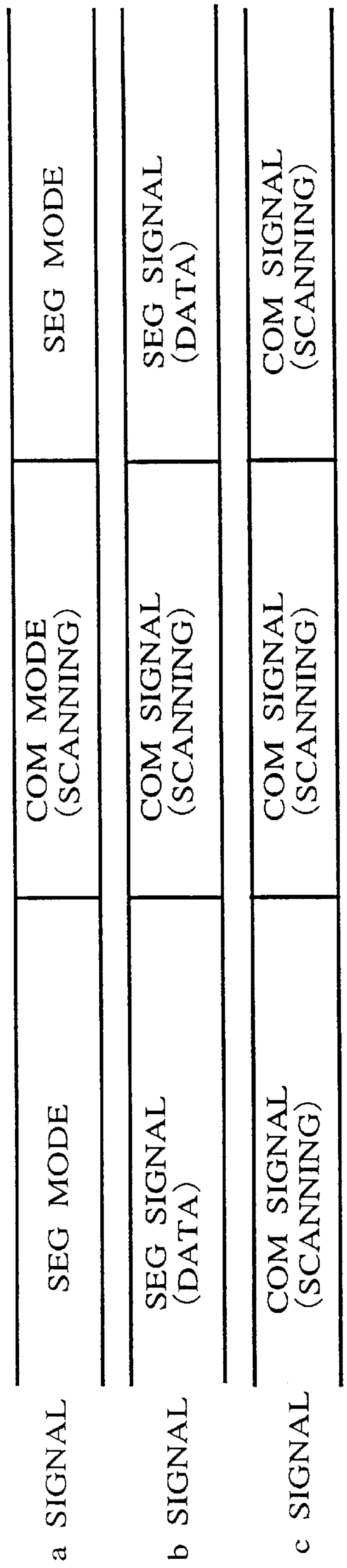
FIG. 2 shows control signals of the LCD of FIG. 1.
Figure 3:
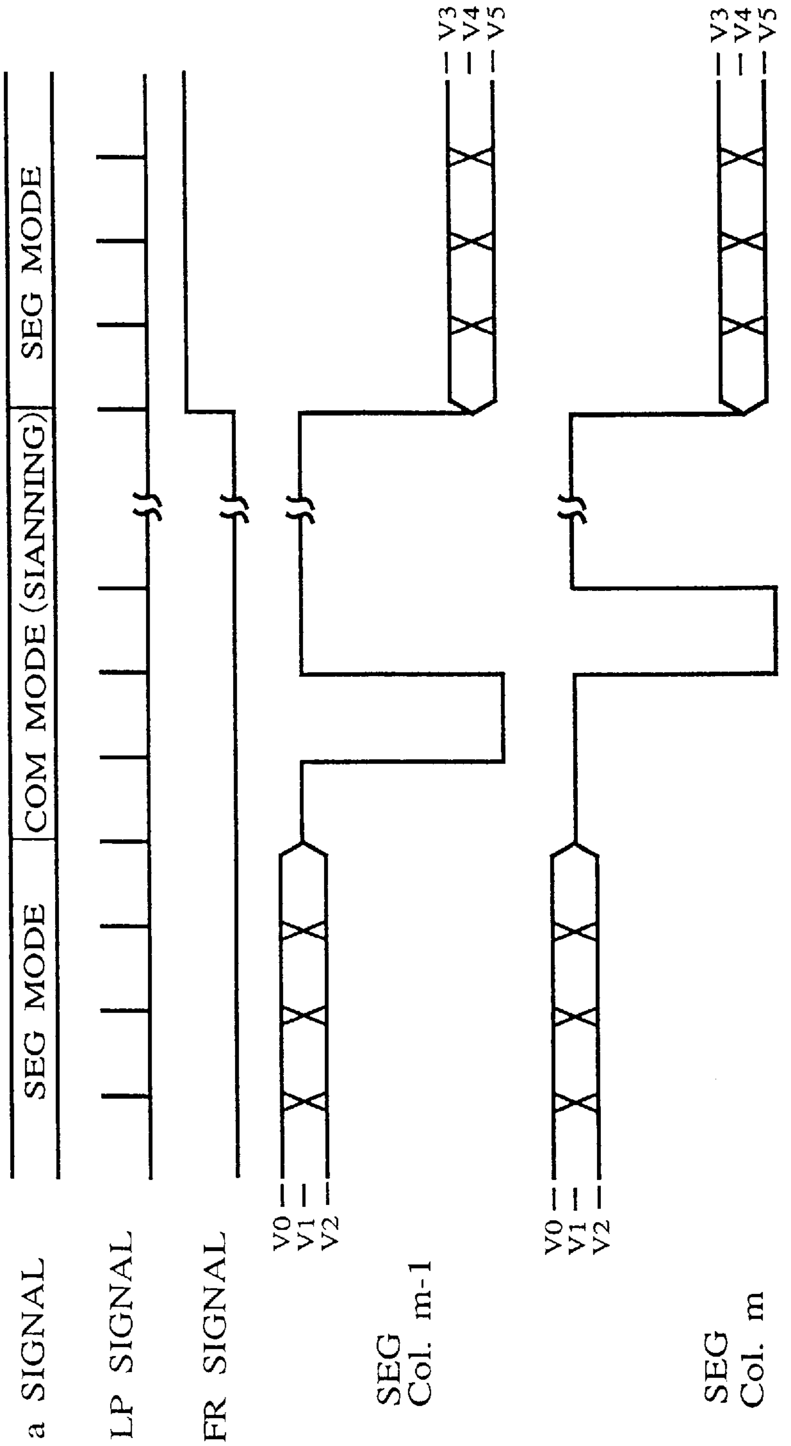
FIG. 3 shows control signals of the LCD of FIG. 1.
Figure 4:
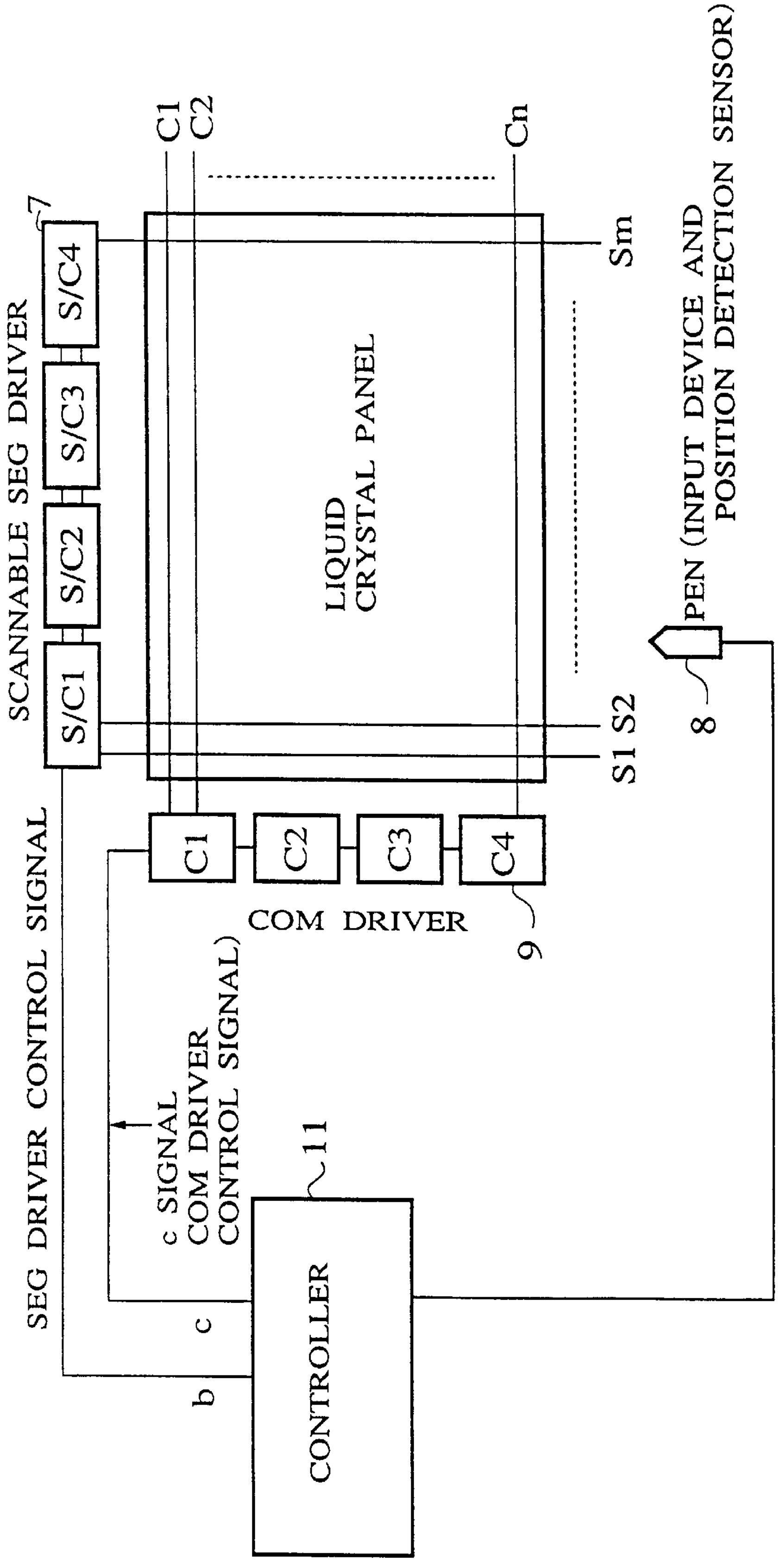
FIG. 4 shows an LCD according to an embodiment of the present invention.

FIG. 4 shows a simple matrix LCD capable of carrying out a pen input scanning operation, according to an embodiment of the present invention.

The LCD has a liquid crystal panel 1. Column electrodes (segment electrodes) S1 to Sm extend vertically in parallel with one another on the panel 1. Row electrodes (common electrodes) C1 to Cn extend horizontally in parallel with one another on the panel 1. The row electrodes C1 to Cn are orthogonal to the column electrodes S1 to Sm. The column electrodes S1 to Sm are driven by a segment driver 7, and the row electrodes C1 to Cn are driven by a common driver 9. The segment driver 7 and common driver 9 operate in response to control signals provided by a controller 11 that carries out a scanning operation. A pen 8 serving as an input device and a sensor is connected to the controller 11 and utilized to point the position in the liquid crystal panel. To detect a pen input, the common driver 9 has a function of sensing a change in the voltage of any one of the row electrodes C1 to Cn. The panel 1 is made of a liquid crystal layer, such as a smectic liquid crystal layer, laid between two glass plates. The row and column electrodes are arranged on the inner surfaces of the glass plates, respectively, to face each other with the liquid crystal layer being interposed between them. If required, an alignment film is formed on the inner surface of each of the glass plates, to get in contact with the liquid crystal layer.

Figure 7:
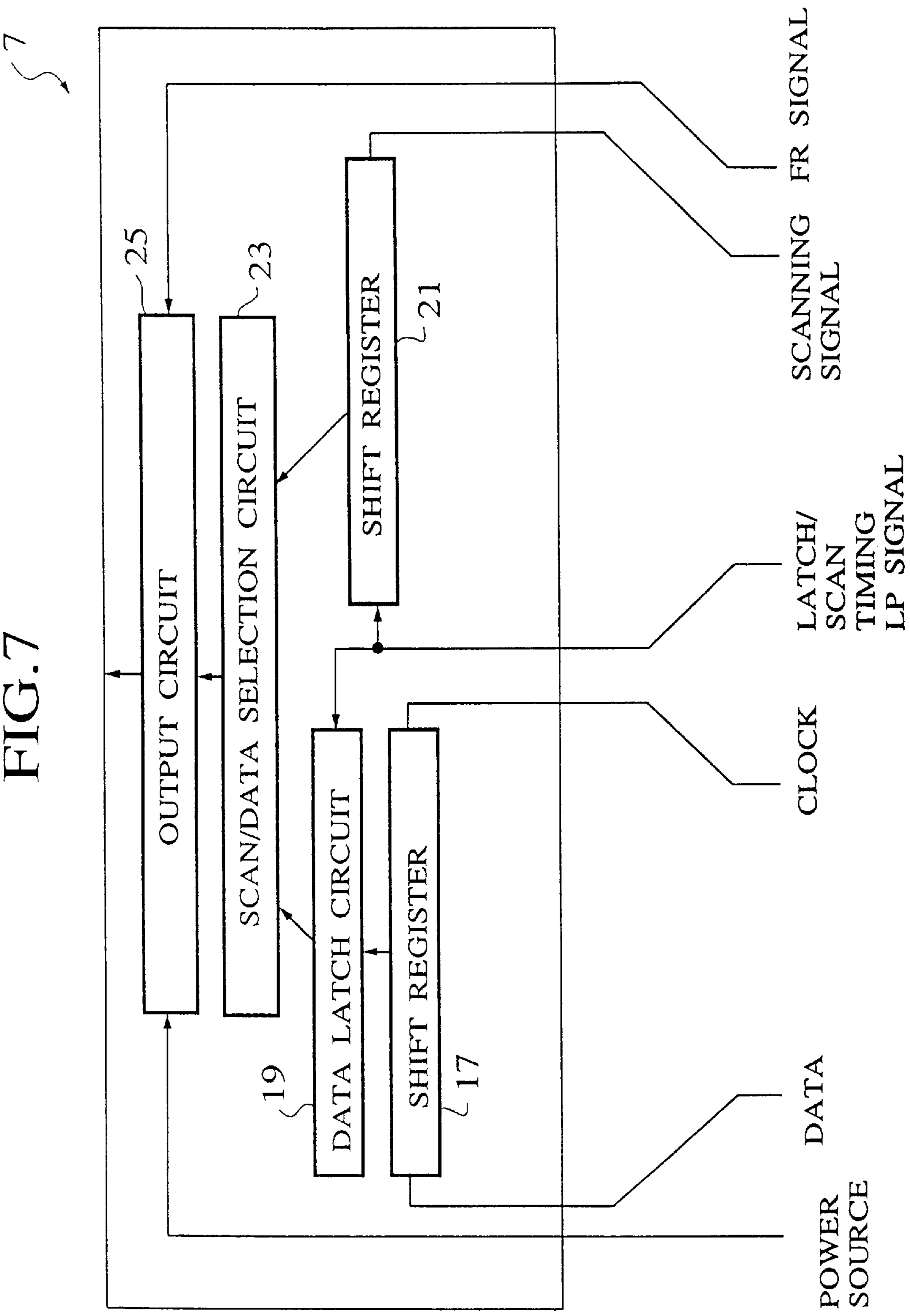
FIG. 7 shows a segment driver of the LCD according to the present invention.

FIG. 7 is a block diagram showing the details of the segment driver 7. The present invention is applicable to a conventional LCD only by modifying a segment driver thereof with the other parts remaining intact. Accordingly, the cost of applying the present invention to conventional LCDs is relatively low.

Figure 5:
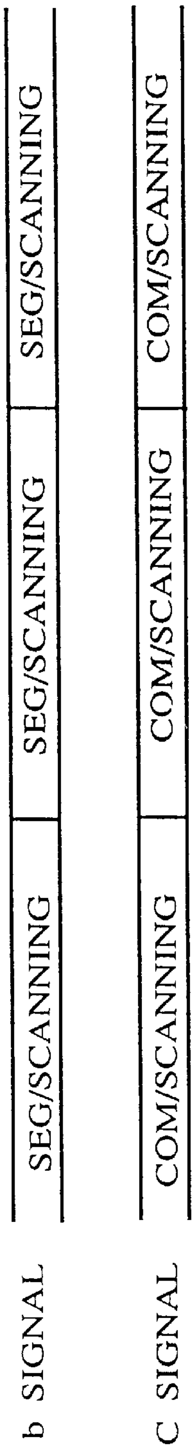
FIG. 5 shows control signals of the LCD of FIG. 4.
Figure 6:
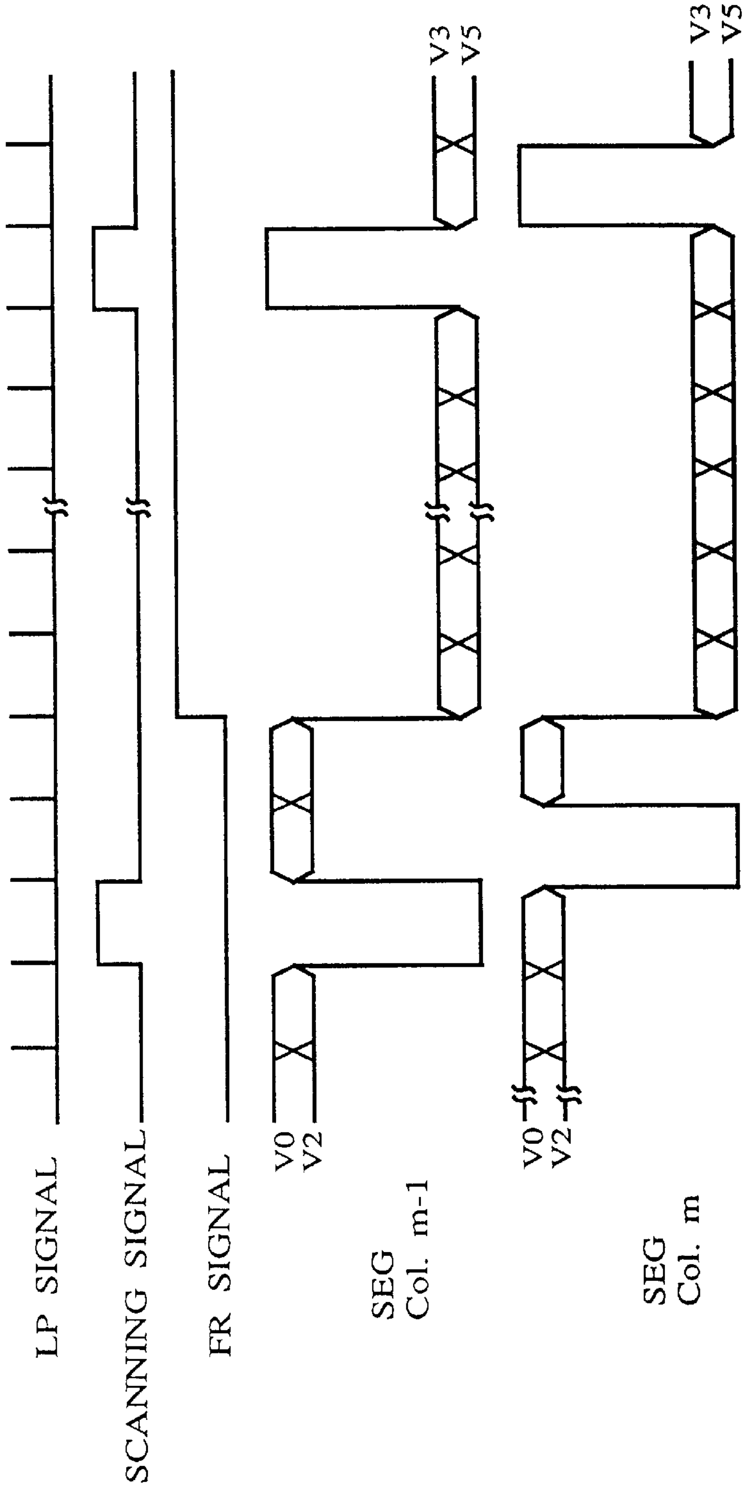
FIG. 6 shows control signals of the LCD of FIG. 4.

The operation of the LCD of FIG. 4 will be explained with reference to FIGS. 5 to 7 in which FIGS. 5 and 6 show drive signals of the LCD and the timing of the signals. The segment driver 7 operates in response to a control signal b, and the common driver 9 in response to a control signal c. Unlike the prior art, the present invention does not employ the signal a for alternating the image displaying operation and pen input scanning operation.

A mechanism of displaying an image on the LCD according to the present invention is basically the same as that of displaying an image on an LCD having no pen input function. Namely, the row electrodes C1 to Cn are activated one after another in response to a common signal, to vertically scan the panel 1. In synchronization with this, the segment driver 7 provides the column electrodes S1 to Sm with display data. When, for example, a row electrode Ck is active, display data on the column electrodes S1 to Sm are displayed along the row electrode Ck. Liquid crystals corresponding to the row electrode Ck keep their states until the row electrode Ck is activated again.

In the segment driver 7 of FIG. 7, a shift register 17 stores display data in synchronization with a data transfer clock signal. The shift register 17 serves as a serial-to-parallel converter for converting serial display data into parallel display data for one row. The parallel display data from the shift register 17 is latched by a latch circuit 19 in synchronization with a latch/scan timing signal EP. The shift register 17 may be a 256-bit shift register, and the latch circuit 19 may be a 256-bit register. Each bit of them corresponds to a horizontal pixel position in one row of the panel 1.

A shift register 21 has the same structure as the shift register 17. In synchronization with the signal LP, the shift register 21 receives a source scanning signal and shifts the same. In accordance with an preferred embodiment, the detection of the pen input position is carried out by repeating scanning operation twice for determination of an input position. The scanning operations in the SEG side and the COM side are initiated at the same time in the first scanning. In this case, because the liquid crystal panel is simultaneously scanned from the SEG side and the COM side, the controller 11 detects two positions. For this reason, the detection of the pen input position is completed by scanning again while the scanning from the SEG side is deferred, following to the scanning from the COM side. In this second scanning operation, the controller 11 detects two positions again as the pen input position. However, the two positions as detected by the first scanning operation and the two positions as detected by the second scanning operation shall share only one position. The shared position detected twice is the true position at which pen input is actually done. The detection of the pen input position is carried out in this manner by repeating the dual scanning.

A selector 23 receives display data from the latch circuit 19 and scan data from the shift register 21 and selectively provides an output circuit 25 with data. More precisely, the data from the selector 23 consists of bits representing signals applied to the column electrodes S1 to Sm, respectively, among which a bit corresponding to the bit "1" in the output of the shift register 21 serves as a pen input scanning signal and the other bits serve as display signals representing the display data from the latch circuit 19.

For example, when the second pulse of the signal LP of FIG. 6 rises, the position of the bit "1" in the output of the shift register 21 corresponds to the column electrode Sm−1. Accordingly, the output circuit 25 provides the column electrode Sm−1 with a low scan voltage instead of a display signal. At the same time, the output circuit 25 provides the other column electrodes with display signals, respectively. This technique maintains the quality of an image displayed on the LCD. The control signals can be substantially same as utilized in the prior art technique except for the scanning signals given to the segment electrodes. The exemplary voltage levels utilized in this case are V0=42V, V1=40V, V2=38V, V3=4V, V4=2V and V5=0V.

When the third pulse of the signal LP rises, the position of the bit "1" in the shift register 21 is shifted by one. Accordingly, the output circuit 25 provides the column electrode Sm with the low scan voltage, and the other column electrodes including the column electrode Sm−1 with display signals. If the position of the pen input is (m, n), the capacitance of the position changes. When the low scan voltage is applied to the column electrode Sm, the voltage formed in the pen changes by coupling an associated capacitance with the voltage variation in the liquid crystal panel side. A signal indicative of voltage change is transferred to the controller, which determines the pen input position from the timing of the voltage change. Consequently, the pen input position (m, n) is detectable.

The phases of the control signals applied to the row and column electrodes are inverted in response to a signal FR. This is to prevent a deterioration of liquid crystals due to one-way bias.

In summary, the present invention provides a pen input LCD that always provides display data through a segment driver, to maintain the quality of a displayed image even during a pen input scanning operation.

The foregoing description of the preferred embodiment has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

What is claimed is:

1. A pen input liquid crystal display comprising:

row electrodes, column electrodes orthogonal to said row electrodes, and a liquid crystal layer interposed between said row and column electrodes, to form a pixel at each intersection between said row and column electrodes, row electrode control means for providing said row electrodes with a control signal; and column electrode control means for providing said column electrodes with control signals, said row electrode control means activating said row electrodes one after another, to carry out a scanning operation, said column electrode control means providing said column electrodes with display signals, respectively, in synchronization with the scanning operation by said row electrode control means, to control the state of said liquid crystal layer and display an image on said liquid crystal layer, wherein, when said display signals are output to said column electrodes, one of said column electrodes has applied thereto a pen input detecting signal in place of a corresponding signal of said display signals while the rest of said column electrodes are given the rest of said display signals, and application of the pen input detecting signal is shifted from one column to another column in the column electrodes during said scanning operation.

2. The pen input liquid crystal display as claimed in claim 1, wherein said column and row electrodes are arranged according to a simple matrix driving method.

3. The pen input liquid crystal display as claimed in claim 1, wherein the pen input scanning operation and image displaying operation occur concurrently.

4. The pen input liquid crystal display as claimed in claim 1, wherein said column electrode control means has a first shift register for converting serial display data into parallel display data, a second shift register for receiving the pen input detecting signal and shifting each bit thereof, and a selector for simultaneously receiving data from the first and second shift registers and providing a signal that serves for both the image displaying operation and pen input scanning operation.

* * * * *